(12) United States Patent
Wang

(10) Patent No.: US 10,812,767 B2
(45) Date of Patent: Oct. 20, 2020

(54) WHITE BALANCE PROCESSING METHOD, ELECTRONIC DEVICE AND COMPUTER READABLE STORAGE MEDIUM

(71) Applicant: GUANGDONG OPPO MOBILE TELECOMMUNICATIONS CORP., LTD., Dongguan, Guangdong (CN)

(72) Inventor: Huichao Wang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 89 days.

(21) Appl. No.: 16/129,425

(22) Filed: Sep. 12, 2018

(65) Prior Publication Data

US 2019/0132564 A1  May 2, 2019

(30) Foreign Application Priority Data

Oct. 30, 2017 (CN) .......................... 2017 1 1037478

(51) Int. Cl.
*H04N 5/235* (2006.01)
*H04N 5/243* (2006.01)
(Continued)

(52) U.S. Cl.
CPC ............. *H04N 9/73* (2013.01); *G06K 9/4647* (2013.01); *H04N 5/2351* (2013.01);
(Continued)

(58) Field of Classification Search
CPC .......... H04N 9/73; H04N 9/735; H04N 5/243; H04N 5/2351; G06K 9/4647; G06K 2101/00
See application file for complete search history.

(56) References Cited

U.S. PATENT DOCUMENTS 7,825,893 B2    11/2010  Oka et al.
8,818,086 B2 *   8/2014  Roux ........................ G06T 5/40
                                                          382/164
(Continued)

FOREIGN PATENT DOCUMENTS

CN    102572206    7/2012
CN    102651818    8/2012
(Continued)

OTHER PUBLICATIONS

EPO, Office Action for EP Application No. 18202291, dated Feb. 13, 2019.
(Continued)

*Primary Examiner* — Hung H Lam
(74) *Attorney, Agent, or Firm* — Hodgson Russ LLP

(57) ABSTRACT

The present disclosure provides a white balance processing method. The white balance processing method includes processing an image to determine whether a light source is contained in a scene corresponding to the image; when the light source is contained in the scene, processing the image according to a first predetermined algorithm to acquire color temperature of the light source in the scene and performing a white balance processing on the image according to the color temperature of the light source; and when no light source is contained in the scene, performing the white balance processing on the image according to a second predetermined algorithm. The present disclosure further provides a white balance processing device, an electronic device and a non-transitory computer readable storage medium.

18 Claims, 8 Drawing Sheets

(51) Int. Cl.
*H04N 9/73* (2006.01)
*G06K 9/46* (2006.01)
*H04N 101/00* (2006.01)

(52) U.S. Cl.
CPC ............ *H04N 5/243* (2013.01); *H04N 9/735* (2013.01); *H04N 2101/00* (2013.01)

(56) References Cited

U.S. PATENT DOCUMENTS

| | | | |
|---|---|---|---|
| 8,830,348 B2* | 9/2014 | Nomura | H04N 9/735 348/223.1 |
| 9,191,640 B1 | 11/2015 | Huang | |
| 10,003,779 B2* | 6/2018 | Ioka | H04N 1/6027 |
| 2004/0036703 A1 | 2/2004 | Aoki et al. | |
| 2006/0176379 A1* | 8/2006 | Hyodo | H04N 9/735 348/223.1 |
| 2010/0231746 A1* | 9/2010 | Nomura | H04N 9/735 348/223.1 |
| 2012/0105672 A1* | 5/2012 | Doepke | H04N 5/2351 348/229.1 |
| 2013/0155274 A1 | 6/2013 | Yoshino et al. | |
| 2014/0168463 A1 | 6/2014 | Tamura | |
| 2015/0130863 A1 | 5/2015 | Santo | |
| 2015/0229898 A1 | 8/2015 | Rivard et al. | |
| 2016/0269707 A1* | 9/2016 | Yoshizaki | H04N 9/735 |
| 2017/0180691 A1 | 6/2017 | Sunkavalli et al. | |
| 2019/0132566 A1 | 5/2019 | Wang | |

FOREIGN PATENT DOCUMENTS

| | | |
|---|---|---|
| CN | 103065156 | 4/2013 |
| CN | 104683780 | 6/2015 |
| CN | 105282530 | 1/2016 |
| CN | 106554835 | 3/2017 |
| CN | 106851121 | 6/2017 |
| CN | 107635123 | 1/2018 |
| CN | 107801012 | 3/2018 |
| JP | 2003224867 | 8/2003 |
| JP | 2007013415 | 1/2007 |

OTHER PUBLICATIONS

WIPO, English translation of the ISR and WO for PCT/CN2018/112627, dated Jan. 30, 2019.
USPTO, Notice of Allowance for U.S. Appl. No. 16/561,370, dated Jan. 13, 2020.
SIPO, First Office Action for CN Application No. 201711037478, dated Nov. 14, 2018.
IPI, Office Action for in Application No. 201814040190, dated Jun. 15, 2020.

* cited by examiner

WHITE BALANCE PROCESSING METHOD, ELECTRONIC DEVICE AND COMPUTER READABLE STORAGE MEDIUM

CROSS REFERENCE TO RELATED APPLICATION

This application claims priority to Chinese Patent Application No. 201711037478.1, filed with the State Intellectual Property Office of P. R. China on Oct. 30, 2017, by GUANGDONG OPPO MOBILE TELECOMMUNICATIONS CORP. and titled with "White Balance Processing Method And Device, Electronic Device And Computer Readable Storage Medium," the entire content of which is incorporated herein by reference.

TECHNICAL FIELD

The present disclosure relates to the field of the image processing technologies, and more particular to a white balance processing method, a white balance processing device, an electronic device, and a computer readable storage medium.

BACKGROUND

In related arts of white balance technology, color temperature of a light source contained in a scene corresponding to an image may be detected and a white balance processing may be performed according to the color temperature of the scene.

SUMMARY

A white balance processing method according to implementations of the present disclosure includes: processing an image to determine whether a light source is contained in a scene corresponding to the image; in response to determining that the light source is contained in the scene, processing the image according to a first predetermined algorithm to acquire color temperature of the light source in the scene and performing a white balance processing on the image according to the color temperature of the light source; and in response to determining that no light source is contained in the scene, performing the white balance processing on the image according to a second predetermined algorithm.

An electronic device according to implementations of the present disclosure includes one or more processors, a memory, and one or more programs. The one or more programs are stored in the memory and are configured to be executable by the one or more processors. The one or more programs include instructions for executing the above white balance processing method.

A non-transitory computer readable storage medium according to implementations of the present disclosure includes computer programs cooperating with an electronic device. The computer programs are executed by a processor to execute the above white balance processing method.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
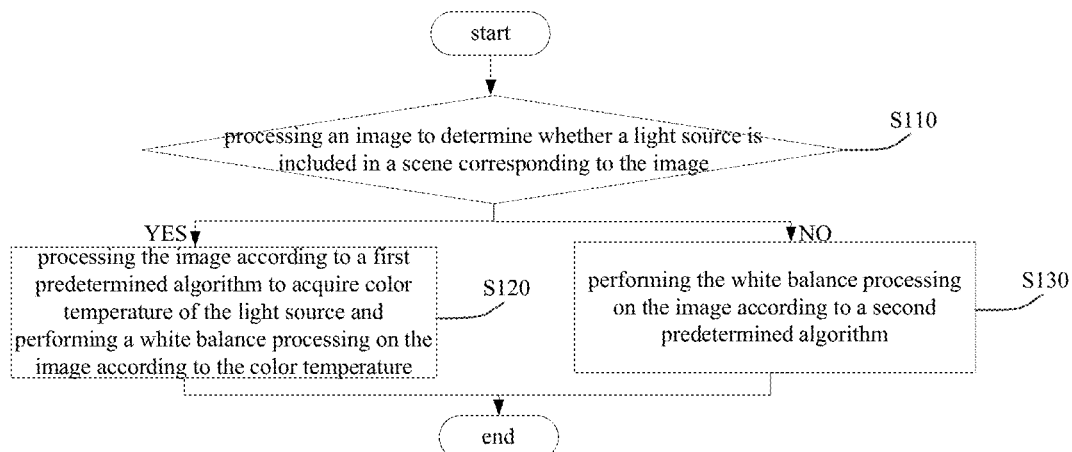
FIG. 1 is a flow chart illustrating a white balance processing method according to some implementations of the present disclosure.

Descriptions will be made in detail to implementations of the present disclosure and examples of the implementations are illustrated in drawings. The same or similar elements and the elements having same or similar functions are denoted by like reference numerals throughout the descriptions. The implementations described herein with reference to drawings are explanatory, are used to understand the implementations of the present disclosure, and are not be construed to limit the implementations of the present disclosure.

In related arts, the white balance technology is unable to perform accurately the white balance processing on an image when no light source is contained in the scene.

Embodiments of the present disclosure provide a white balance processing method, a white balance processing device, an electronic device, and a non-transitory computer readable storage medium.

The white balance processing method according to implementations of the present disclosure includes: processing an image to determine whether a light source is contained in a scene corresponding to the image; in response to determining that the light source is contained in the scene, processing the image according to a first predetermined algorithm to acquire color temperature of the light source in the scene and performing a white balance processing on the image according to the color temperature of the light source; and in response to determining that no light source is contained in the scene, performing the white balance processing on the image according to a second predetermined algorithm.

The white balance processing device according to implementations of the present disclosure includes: a first processing module, configured to process an image to determine whether a light source is contained in a scene corresponding to the image; a second processing module, configured to process the image according to a first predetermined algorithm to acquire color temperature of the light source in the scene and perform a white balance processing on the image according to the color temperature of the light source, in response to determining that the light source is contained in the scene; and a third processing module, configured to perform the white balance processing on the image according to a second predetermined algorithm, in response to determining that no light source is contained in the scene. An electronic device according to implementations of the present disclosure includes one or more processors, a memory and one or more programs. The one or more programs are stored in the memory and are configured to be executable by the one or more processors. The one or more programs include instructions for executing the above white balance processing method.

A non-transitory computer readable storage medium according to implementations of the present disclosure includes computer programs cooperating with an electronic device. The computer programs are executed by a processor to execute the above white balance processing method.

With the white balance processing method, the white balance processing device, the electronic device and the non-transitory computer readable storage medium according to implementations of the present disclosure, when no light source is contained in the scene, the white balance processing is performed on the image according to the second predetermined algorithm that is different from the first predetermined algorithm. Therefore, the color of the image subjected to the white balance processing is close to the real-world color of the scene.

As illustrated in FIG. 1, a white balance processing method according to an implementation of the present disclosure includes the followings.

In block S110, an image is processed to determine whether a light source is contained in a scene corresponding to the image.

In block S120, when the light source is contained in the scene, color temperature of the light source is acquired by processing the image with a first predetermined algorithm and a white balance processing is performed on the image according to the color temperature of the light source.

In block S130, when no light source is contained in the scene, the white balance processing is performed on the image according to a second predetermined algorithm. The second predetermined algorithm is different from the first predetermined algorithm.

With the white balance processing method according to implementations of the present disclosure, when no light source is contained in the scene, the white balance processing is performed on the image according to the second predetermined algorithm that is different from the first predetermined algorithm. Therefore, the color of the image subjected to the white balance processing is close to the real-world color of the scene.

In some implementations, the first predetermined algorithm refers to performing the white balance processing on the image by detecting the color temperature of the light source, such as a mirror reflection method. The second predetermined algorithm refers to performing the white balance processing without detection of the color temperature of the light source, such as a gray word method, a dynamic threshold method or the like.

In some implementations, a correspondence between the color temperature of light sources and white balance parameters is determined in advance. After the color temperature of the light source is acquired according to a color of the light source, the white balance parameter may be acquired by performing a search on the correspondence between color temperature of light sources and white balance parameters based on the color temperature of the light source. Therefore, the white balance processing may be performed on the image according to the acquired white balance parameter.

Figure 2:
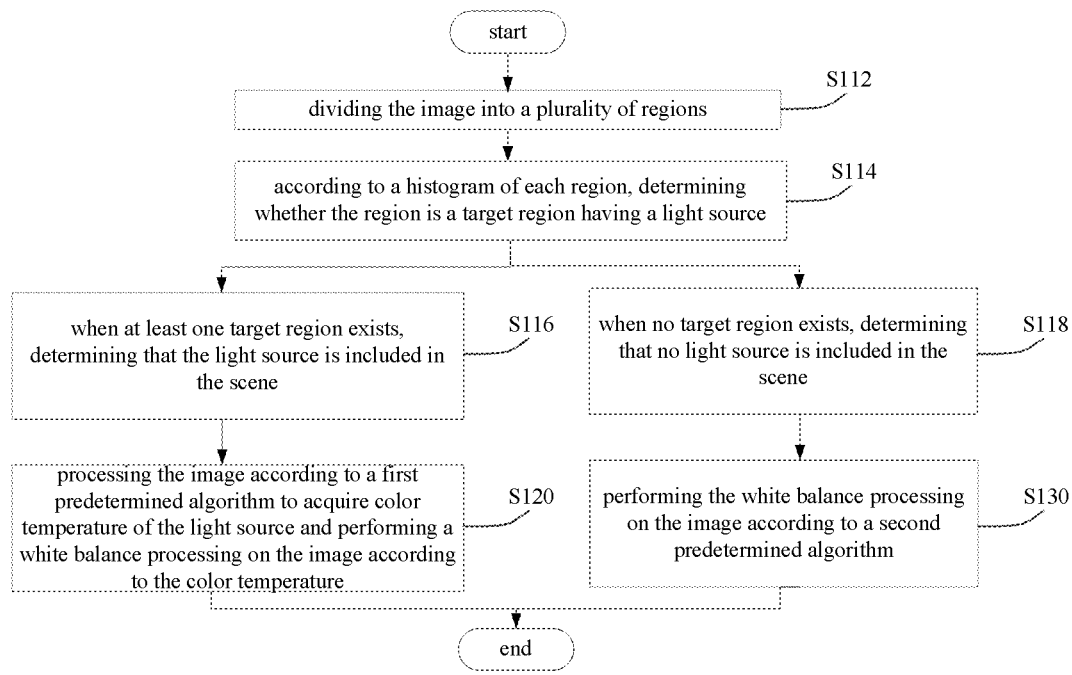
FIG. 2 is a flow chart illustrating a white balance processing method according to some implementations of the present disclosure.

As illustrated in FIG. 2, in some implementations, the block S110 includes the followings.

In block S112, the image is divided into a plurality of regions.

In block S114, according to a histogram of each region, it is determined whether the region is a target region having the light source.

In block S116, when at least one target region exists, it is determined that the light source is contained in the scene.

In block S118, when no target region exists, it is determined that no light source is contained in the scene.

Therefore, whether a light source is contained in the scene or not may be determined according to the histogram of each region.

Specifically, the image may be divided into a plurality of regions. For example, the image may be divided into 64*48 regions. According to the histogram of each region, it may be determined whether, in each region, a ratio of the number of pixels exceeds a predetermined ratio. Each of the pixels has a pixel value greater than a predetermined pixel value P. For example, the predetermined pixel value P may be about 239, and the predetermined ratio may be about 5%. That is, it is determined whether the ratio of the number of pixels exceeds 5%. Each of the pixels has the pixel value greater than 239. The region corresponding to the ratio of the number of pixels each having the pixel value greater than 239 exceeding 5% is determined as the target region having the light source. It is determined whether the target region exists in the image, and when the target region exists in the image, it is indicated that the light source is contained in the scene corresponding to the image. When no target region exists in the image, it is indicated that no light source is contained in the scene corresponding to the image.

Figure 3:
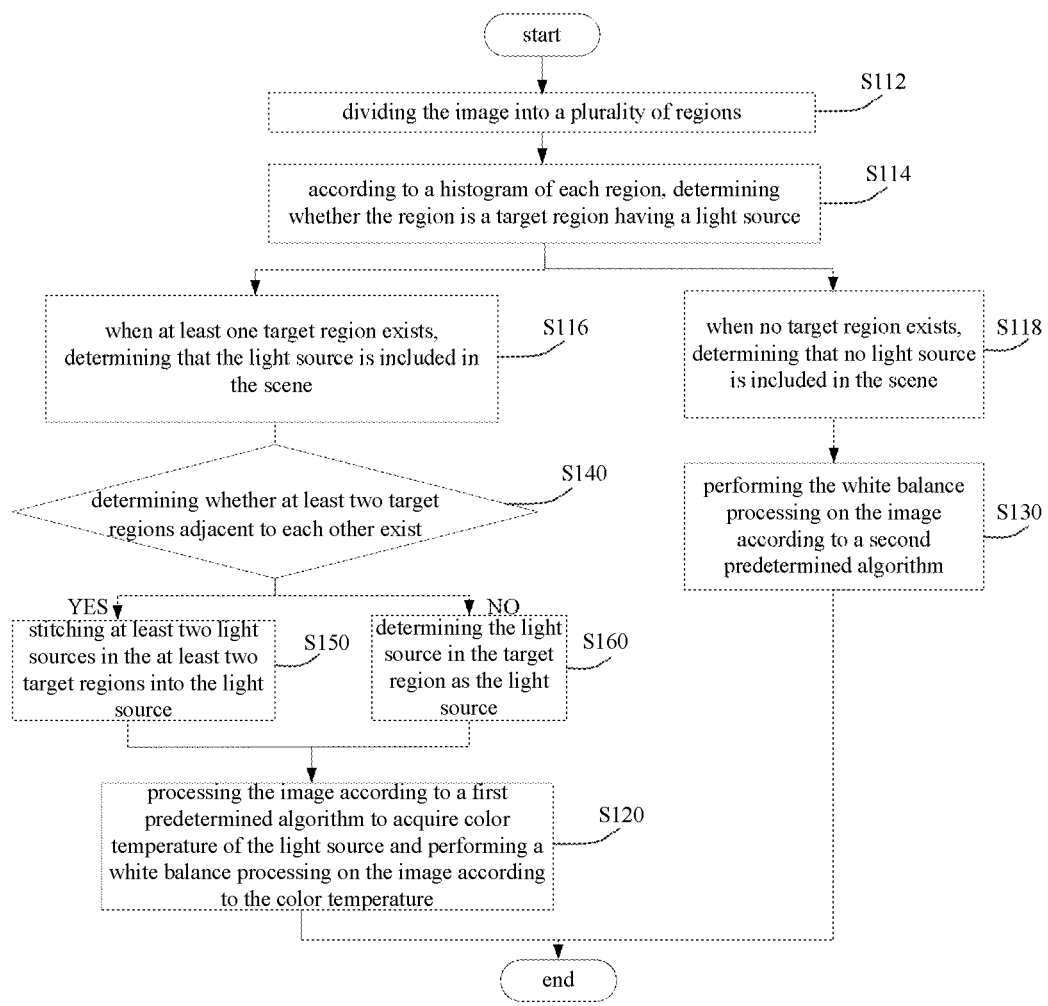
FIG. 3 is a flow chart illustrating a white balance processing method according to some implementations of the present disclosure.

In some implementations, after the block S110, as illustrated in FIG. 3, the white balance processing method includes the followings.

In block S140, when the light source is contained in the scene, it is determined whether at least two target regions adjacent to each other exist.

In block S150, when the at least two target regions exist, at least two light sources contained in the at least two target regions are stitched into the light source contained in the scene.

In block S160, when the at least two target regions do not exist, the light source contained in the target region is determined as the light source contained in the scene.

Therefore, the position of the light source in the image may be determined.

When the target region exists in the image, it is determined whether at least two target regions adjacent to each other exist. When the at least two target images exist, the at least two light sources contained in the at least two target regions are parts of a same light source. Therefore, the at least two light sources contained in the at least two target regions may be stitched into a single light source as the light source contained in the scene. When the at least two target regions do not exist, the light source contained in the target region may be determined as the light source contained in the scene. Therefore, the position of the light source may be determined based on the one or more target region.

Figure 4:
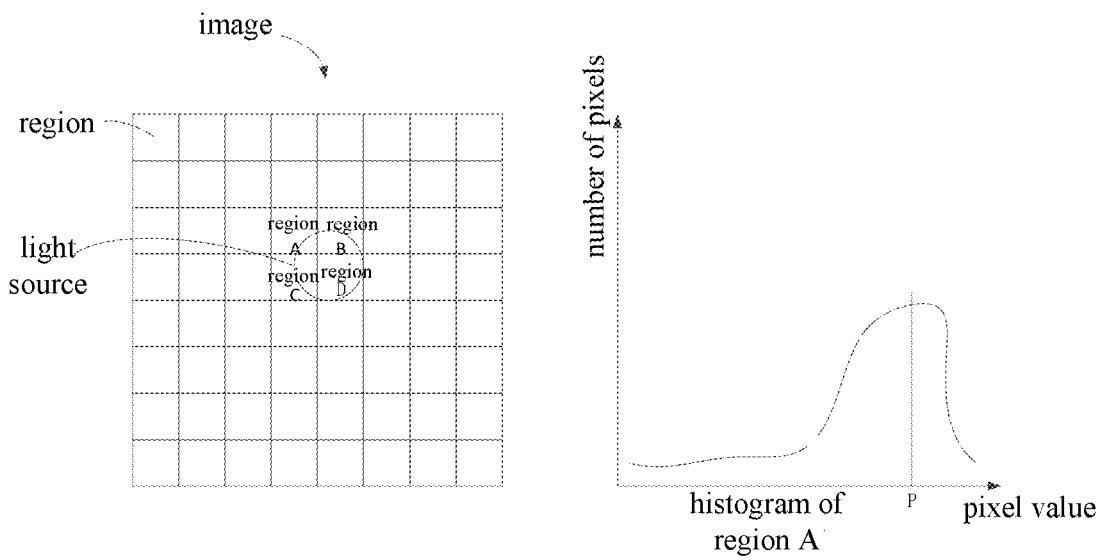
FIG. 4 is a schematic diagram illustrating a scenario for performing a white balance processing according to some implementations of the present disclosure.

As illustrated in FIG. 4, in an example, when the light source is contained in the image, it may be determined that a region A, a region B, a region C, and a region D each is the target region having the light source according to the histogram of each region. For example, based on the histogram of the region A, it may be determined that the ratio of pixels contained in the region A and having the pixel value greater than the predetermined pixel value P exceeds the predetermined ratio. Since the region A, the region B, the region C, and the region D are target regions adjacent to each other, the light sources contained in the region A, the region B, the region C, and the region D may be stitched into a single light source.

Figure 5:
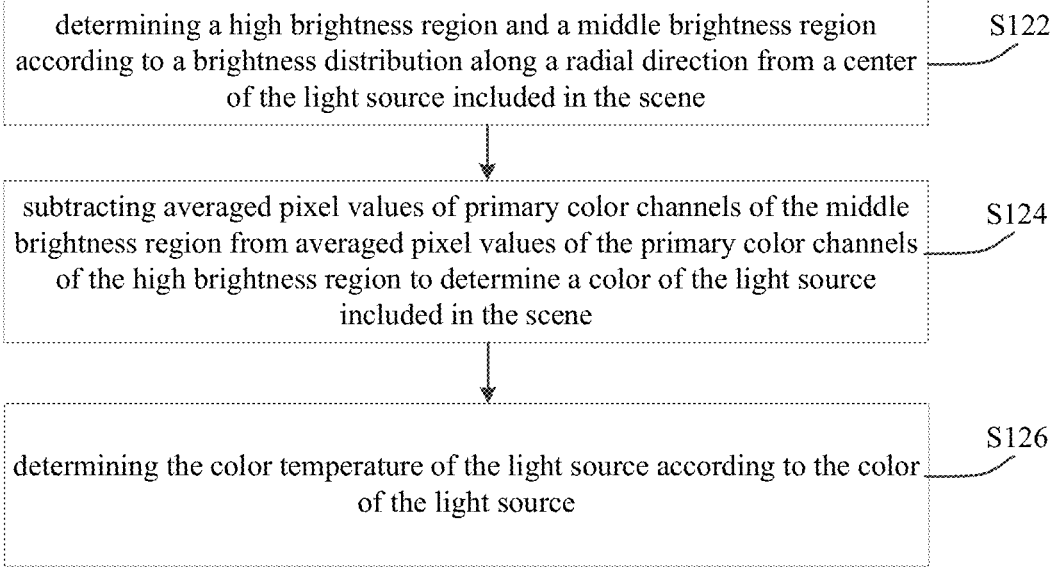
FIG. 5 is a flow chart illustrating a white balance processing method according to some implementations of the present disclosure.
Figure 6:
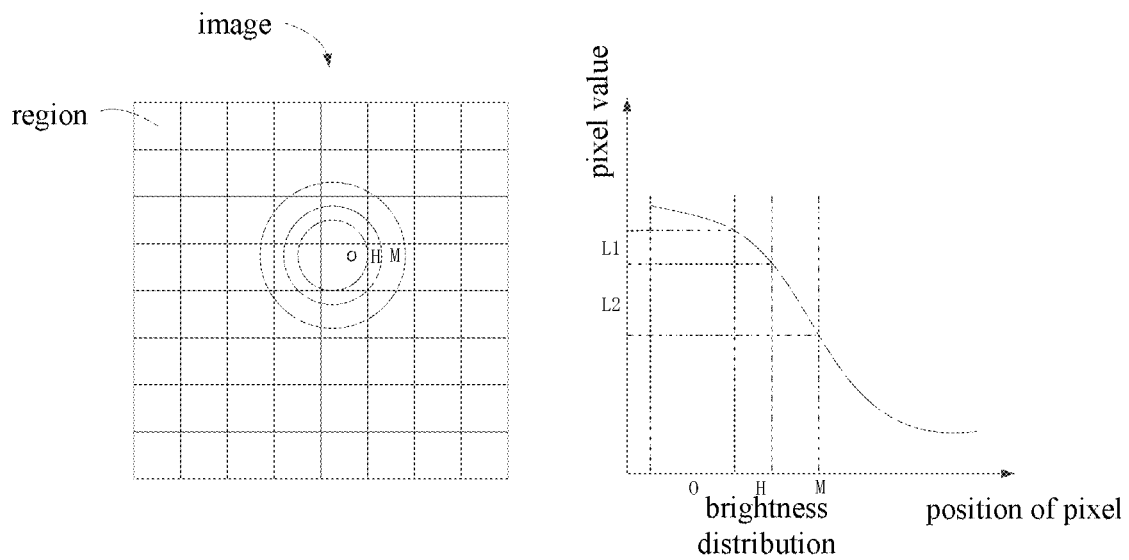
FIG. 6 is a schematic diagram illustrating a scenario for performing a white balance processing according to some implementations of the present disclosure.

As illustrated in FIGS. 5 and 6, in some implementations, the block S120 includes the followings.

In block S122, a high brightness region H and a middle brightness region M are determined according to a brightness distribution along a radial direction from a center O of the light source.

In block S124, a color of the light source contained in the scene is determined by subtracting averaged pixel values of primary color channels of the middle brightness region M from averaged pixel values of the primary color channels of the high brightness region H.

In block S126, the color temperature of the light source is determined according to the color of the light source.

Therefore, the color of the light source may be determined according to the high brightness region H and the middle brightness region M.

As illustrated in FIG. 6 again, the position of the light source in the image may be determined. It may be understood that, the center O of the light source contained in the image is over-exposed, which is generally a big white spot and excludes any information of the color of the light source. The color of the light source may be determined according to the averaged pixel values of the primary color channels of the high brightness region H and the averaged pixel values of the primary color channels of the middle brightness region M. The high brightness region H may refer to a region defined by pixels each having a brightness value within a first brightness range L1 along the radial direction from the center of the light source. For example, the first brightness range L1 is [200, 239). The middle brightness region M may refer to a region defined by pixels each having a brightness value within a second brightness range L2 along the radial direction from the center of the light source. For example, the second brightness range L2 is [150, 200). It is to be noted that, the first brightness range L1 and the second brightness range L2 may be determined according to the brightness distribution along the radial direction from the center of light source. For example, when the brightness of the light source is attenuated rapidly, the first brightness range L1 and the second brightness range L2 may be suitably increased. For example, when the brightness of the light source is attenuated slowly, the first brightness range L1 and the second brightness range L2 may be suitably decreased.

In some implementations, the primary color channel refers to a channel with a primary color, for example, at least one of a red (R) channel, a green-red (Gr) channel, a green-blue (Gb) channel and a blue (B) channel. In some implementations, the pixel value of the green (G) channel may be obtained based on the pixel value of the green-red (Gr) channel and the pixel value of the green-blue (Gb) channel. An averaged pixel value for each of the primary color channels may refer to an arithmetic average of a plurality of pixel values for that primary color channels. The plurality of pixel values may be pixel values of all pixels included in the high brightness region or in the middle brightness region. In an example, averaged pixel values of the primary color channels ($R_{avg}$, $G_{avg}$, $B_{avg}$) of the high brightness region are (200, 210, 220), while the averaged pixel values of the primary color channels ($R_{avg}$, $G_{avg}$, $B_{avg}$) of the middle brightness region are (160, 180, 190), and the pixel values of red, green and blue channels (R, G, B) of the light source are (200-160, 210-180, 220-190), i.e., (40, 30, 30).

In some implementations, determining the color temperature of the light source according to the color of the light source may be implemented as follows. The color temperature of the light source may be determined according to the color of the light source and the correspondence between colors of light sources and color temperature of the light sources. The correspondence between the colors of the light sources and the color temperature of the light sources may be a mapping table or a color temperature curve.

Figure 7:
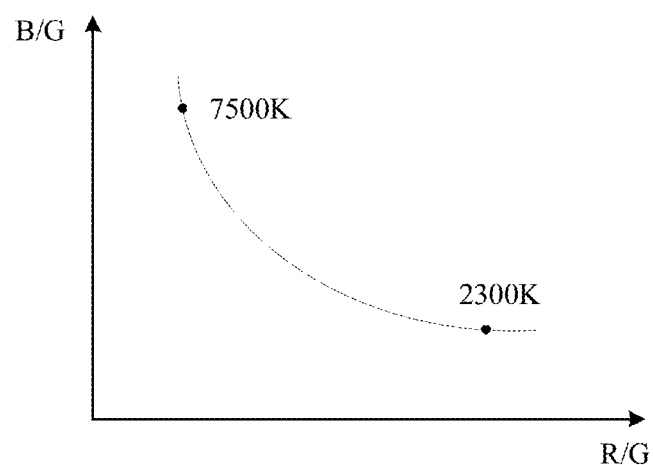
FIG. 7 is a color temperature curve according to some implementations of the present disclosure.

As illustrated in FIG. 7, in one embodiment, images may be obtained under illumination with standard light boxes having color temperature of 3000K, 4000K and 5000K, and the colors of the light sources under the above color temperature may be determined by performing a calculation. Therefore, the color temperature curve between colors of light sources and color temperature of light sources is obtained. The color temperature curve may be stored in the electronic device 1000. The color temperature of the light source may be obtained by performing a search on the color temperature curve based on the color of the light source.

Figure 8:
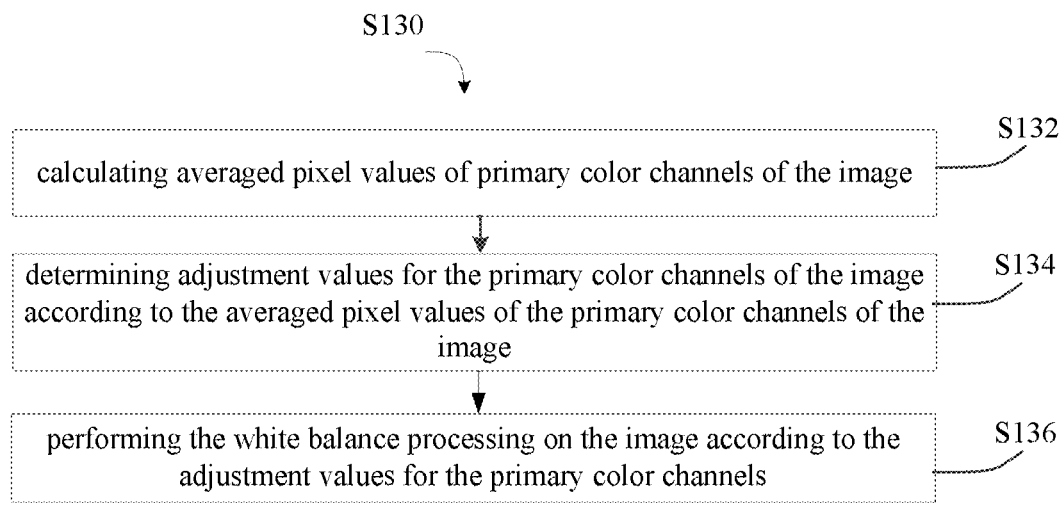
FIG. 8 is a flow chart illustrating a white balance processing method according to some implementations of the present disclosure.

As illustrated in FIG. 8, in some implementations, the block S130 includes the followings.

In block S132, averaged pixel values of primary color channels of the image are calculated.

In block S134, adjustment values of pixel values of the primary color channels of the image are determined according to the averaged pixel values of primary color channels of the image.

In block S136, the white balance processing is performed on the image according to the adjustment values of the pixel values of the primary color channels.

Therefore, the white balance processing is performed on the image according to the averaged pixel values of primary color channels of the image.

Specifically, an arithmetic average of pixel values of all pixels of the whole image is calculated to obtain an averaged pixel value for each of the primary color channels. For example, the averaged pixel values of the primary color channels ($R_{avg}$, $G_{avg}$, $B_{avg}$) of the whole image are (50, 100, 150). The adjustment values of the pixel values of primary color channels of the image may be determined according to the averaged pixel values of the primary color channels. It may be understood that, an adjustment reference value K may be determined according to the averaged pixel values of the primary color channels of the whole image. For example K=($R_{avg}$+$G_{avg}$+$B_{avg}$)/3=200/3. For each of the primary color channels of the image, the adjustment value of the pixel value of each of the primary color channels of the image may be determined according to the adjustment reference value K and the averaged pixel value. For example, the adjustment value for red (R) channel is K/$R_{avg}$=(200/3)/50=4/3. The adjustment value for green (G) channel is K/$G_{avg}$=(200/3)/100=2/3. The adjustment value for blue (B) channel is K/$B_{avg}$=(200/3)/50=4/3. The white balance processing is performed on the image according to the adjustment values of the primary color channels. It may be understood that, for each pixel, the pixel value after adjustment may be obtained by multiplying the pixel value of each primary color channel by the adjustment value of a corresponding primary color channel. All obtained pixel values are binned as an image that is the image subjected to the white balance processing. For example, the pixel values of primary color channels of a single pixel contained in an image are (100, 200, 200), for the pixel contained in the image subjected to the white balance processing according to the adjustment values of the primary color channels, the pixel values of primary color channels are (100*4/3, 200*2/3, 200*4/3)=(400/3, 400/3, 800/3).

Embodiments of the present disclosure further provide a white balance processing device.

Figure 9:
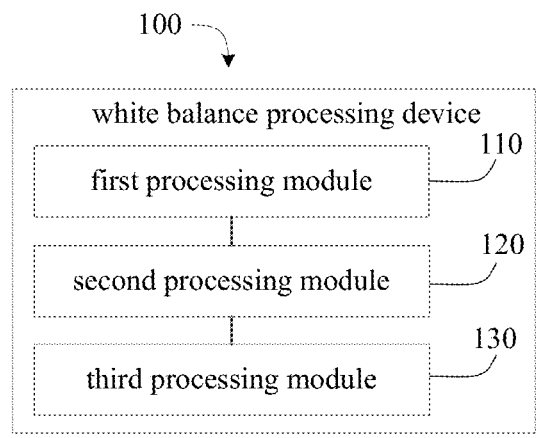
FIG. 9 is a block diagram illustrating a white balance processing device according to some implementations of the present disclosure.

As illustrated in FIG. 9, a white balance processing device 100 according to an implementation of the present disclosure includes a first processing module 110, a second processing module 120 and a third processing module 130. The first processing module 110 is configured to process an image to determine whether a light source is contained in a scene corresponding to the image. The second processing module 120 is configured to acquire color temperature of the light source by processing the image with a first predetermined algorithm and perform a white balance processing on the image according to the color temperature of the light source, when the light source is contained in the scene. The third processing module 130 is configured to perform the white balance processing on the image according to a second predetermined algorithm, when no light source is contained in the scene. The second predetermined algorithm is different from the first predetermined algorithm.

The white balance processing method according to an implementation of the present disclosure may be implemented by the white balance processing device 100 according to an implementation of the present disclosure. The block S110 may be implemented by the first processing module 110. The block S120 may be implemented by the second processing module 120. The block S130 may be implemented by the third processing module 130.

Figure 10:
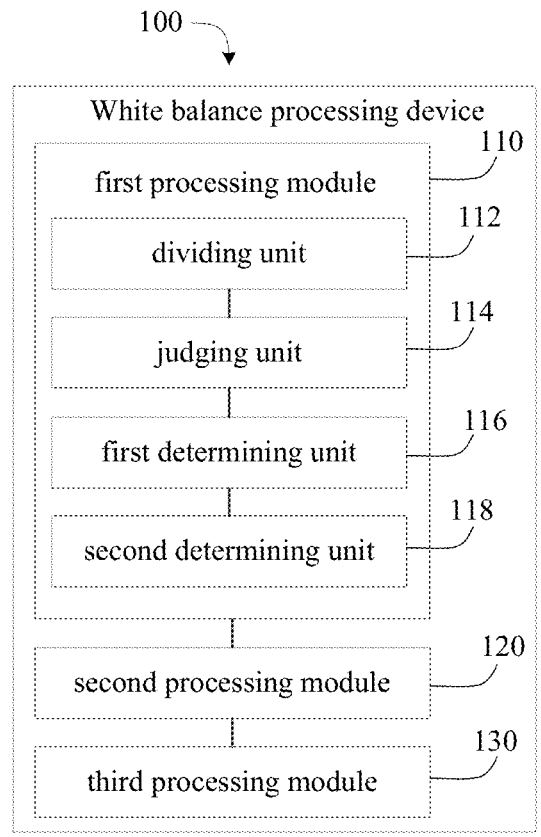
FIG. 10 is a block diagram illustrating a white balance processing device according to some implementations of the present disclosure.

As illustrated in FIG. 10, in some implementations, the first processing module 110 includes a dividing unit 112, a judging unit 114, a first determining unit 116 and a second determining unit 118. The dividing unit 112 is configured to divide the image into a plurality of regions. The judging unit 114 is configured to, according to a histogram of each region, determine whether the region is a target region having the light source. The first determining unit 116 is configured to determine that the light source is contained in the scene, when at least one target region exists. The second determining unit 118 is configured to determine that no light source is contained in the scene, when no target region exists.

That is to say, the block S112 may be implemented by the dividing unit 112. The block S114 may be implemented by the judging unit 114. The block S116 may be implemented by the first determining unit 116. The block S118 may be implemented by the second determining unit 118.

Figure 11:
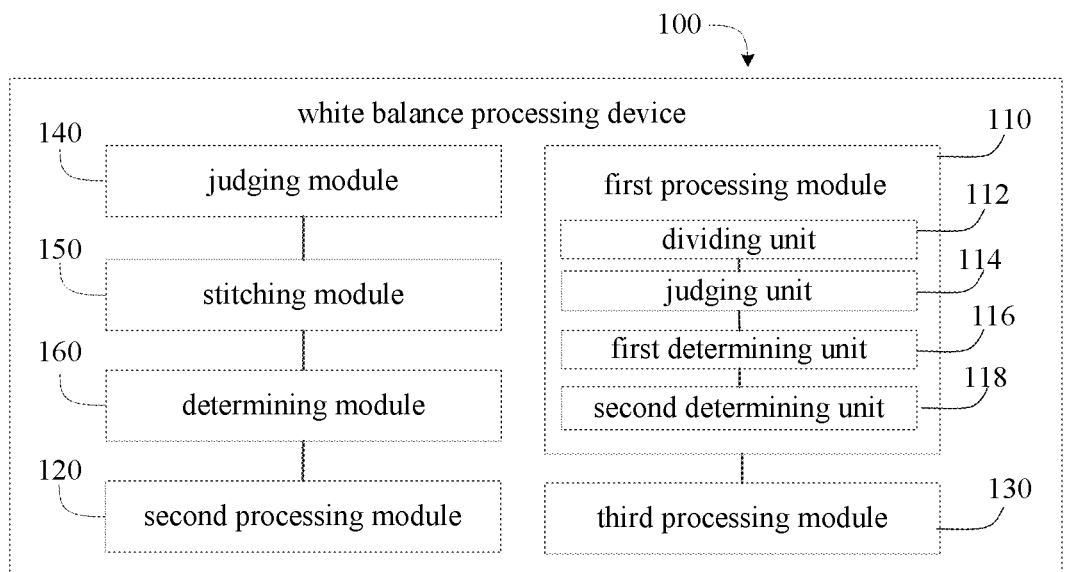
FIG. 11 is a block diagram illustrating a white balance processing device according to some implementations of the present disclosure.

As illustrated in FIG. 11, in some implementations, the white balance processing device 100 includes a judging module 140, a stitching module 150 and a determining module 160. The judging module 140 is configured to determine whether at least two target regions adjacent to each other exist, when the light source is contained in the scene. The stitching module 150 is configured to stitch at least two light sources contained in the at least two target regions into the light source contained in the scene, when the at least two target regions exist. The determining module 160 is configured to determine the light source contained in the target region as the light source contained in the scene, when the at least two target regions do not exist.

Figure 12:
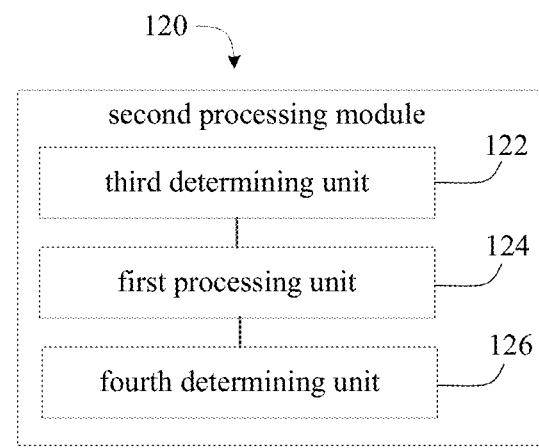
FIG. 12 is a diagram block illustrating a second processing module according to some implementations of the present disclosure.

As illustrated in FIGS. 12 and 6, in some implementations, the second processing module 120 includes a third determining unit 122 and a first processing unit 124 and a fourth determining unit 126. The third determining unit 122 is configured to determine a high brightness region H and a middle brightness region M according to a brightness distribution along a radial direction from a center O of the light source. The first processing unit 124 is configured to determine a color of the light source by subtracting averaged pixel values of primary color channels of the middle brightness region H from averaged pixel values of the primary color channels of the high brightness region M. The fourth determining unit 126 is configured to determine the color temperature of the light source according to the color of the light source.

That is to say, the block S122 may be implemented by the third determining unit 122. The block S124 may be implemented by the first processing unit 124. The block S126 may be implemented by the fourth determining unit 126.

Figure 13:
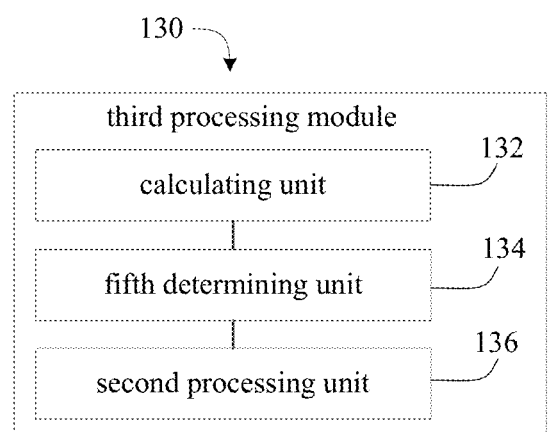
FIG. 13 is a block diagram illustrating a third processing module according to some implementations of the present disclosure.

As illustrated in FIG. 13, in some implementations, the third processing module 130 includes a calculating unit 132, a fifth determining unit 134 and a second processing unit 136. The calculating unit 132 is configured to calculate averaged pixel values of primary color channels of the image. The fifth determining unit 134 is configured to determine adjustment values of pixel values of the primary color channels of the image according to the averaged pixel values of the primary color channels of the image. The second processing unit 136 is configured to perform the white balance processing on the image according to the adjustment values of the pixel values of the primary color channels.

Figure 14:
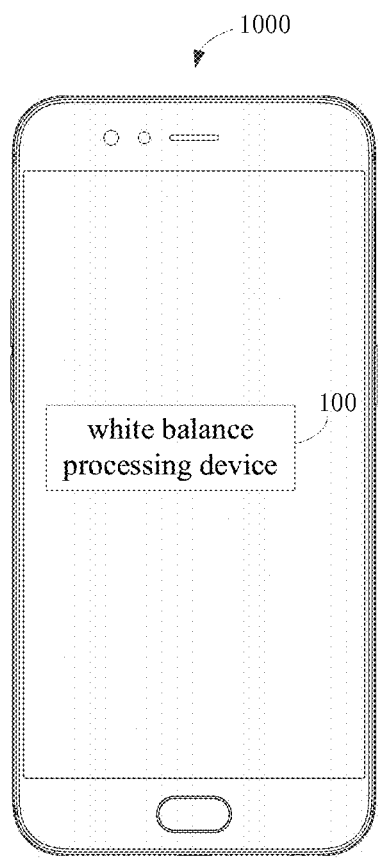
FIG. 14 is a plan view illustrating an electronic device according to some implementations of the present disclosure.

As illustrated in FIG. 14, the white balance processing device 100 according to an implementation of the present disclosure may be integrated into an electronic device 1000 according to an implementation of the present disclosure. That is to say, the electronic device 1000 according to an implementation of the present disclosure may include the white balance processing device 100 according to an implementation of the present disclosure.

In an implementation, the electronic device 1000 includes a phone, a tablet computer, a laptop computer, a smart wrist strap, a smart watch, a smart helmet, smart glasses or the like.

Figure 15:
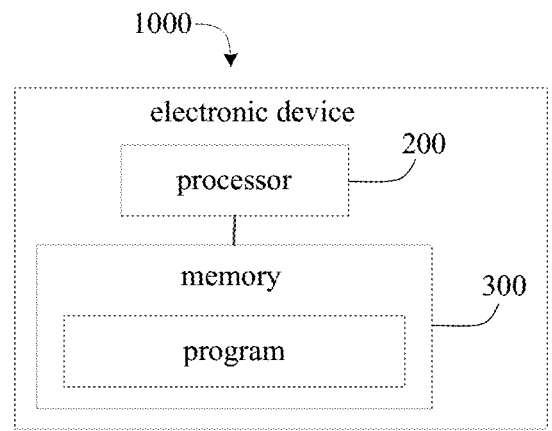
FIG. 15 is a block diagram illustrating an electronic device according to some implementations of the present disclosure.

As illustrated in FIG. 15, an electronic device 1000 according to an implementation of the present disclosure includes one or more processors 200, a memory 300 and one or more programs. The one or more programs are stored in the memory 300 and are configured to be executable by the one or more processors 200. The one or more programs include instructions for implementing the white balance processing method according to any one of above implementations.

For example, the one or more programs include instructions for implementing the white balance processing method including the followings.

In block S110, an image is processed to determine whether a light source is contained in a scene corresponding to the image.

In block S120, when the light source is contained in the scene, color temperature of the light source is acquired by processing the image with a first predetermined algorithm and a white balance processing is performed on the image according to the color temperature of the light source.

In block S130, when no light source is contained in the scene, the white balance processing is performed on the image according to a second predetermined algorithm. The second predetermined algorithm is different from the first predetermined algorithm.

For example, the one or more programs include instructions for implementing the white balance processing method including the followings.

In block S112, the image is divided into a plurality of regions.

In block S114, according to a histogram of each region, it is determined whether the region is a target region having the light source.

In block S116, when at least one target region exists, it is determined that the light source is contained in the scene.

In block S118, when no target region exists, it is determined that no light source is contained in the scene.

Figure 16:
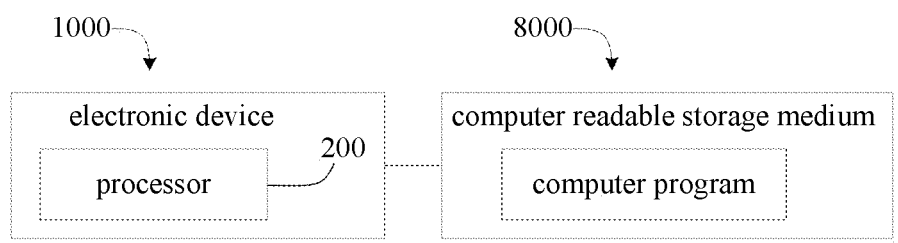
FIG. 16 is a schematic diagram illustrating a coupling between an electronic device and a computer readable storage medium according to some implementations of the present disclosure.

As illustrated in FIG. 16, a computer readable storage medium 8000 according to an implementation of the present disclosure includes a computer program cooperated with the electronic device 1000. The computer program may be executable by the one or more processors 200 to implement the white balance processing method according to any one of the above implementations. The white balance processing method includes the followings, In block S110, an image is processed to determine whether a light source is contained in a scene corresponding to the image.

In block S120, when the light source is contained in the scene, color temperature of the light source is acquired by processing the image with a first predetermined algorithm and a white balance processing is performed on the image according to the color temperature of the light source.

In block S130, when no light source is contained in the scene, the white balance processing is performed on the image according to a second predetermined algorithm. The second predetermined algorithm is different from the first predetermined algorithm.

For example, the computer program may also be executable by the one or more processors 200 to implement the white balance processing method including the followings.

In block S112, the image is divided into a plurality of regions.

In block S114, according to a histogram of each region, it is determined whether the region is a target region having the light source.

In block S116, when at least one target region exists, it is determined that the light source is contained in the scene.

In block S118, when no target region exists, it is determined that no light source is contained in the scene.

In the description of the present disclosure, reference throughout this specification to "an embodiment", "some embodiments", "a schematic example", "an example", "a specific example" or "some examples" means that a particular feature, structure, material, or characteristic described in connection with the implementation or example is included in at least one implementation or example of the present disclosure. In the specification, schematic expressions of the above terms are not necessarily referring to the same embodiment or example of the present disclosure. Furthermore, the particular features, structures, materials, or characteristics may be combined in any suitable manner in one or more implementations or examples.

In addition, terms "first" and "second" are only used for purposes of description and are not intended to indicate or imply relative importance or the number of technical features. In addition, the feature defined with "first" and "second" may explicitly or implicitly comprise one or more this feature. In the description of the present disclosure, the term "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution may be different from that which is depicted or discussed, including executing functions in a substantially simultaneous manner or in an opposite order according to the related functions, which should be understood by those skilled in the art of the embodiments of the present disclosure.

The logic and/or steps described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to (a non-exhaustive list): an electronic connection (IPM overcurrent protection circuit) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the implementations of the present disclosure may be realized by the hardware, software, firmware or their combination. In the above implementations, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, Although explanatory embodiments have been shown and described, it would be appreciated by those skilled in the art that the above embodiments are exemplary and cannot be construed to limit the present disclosure, and changes, modifications, alternatives, and variations can be made in the embodiments within the scope of the present disclosure.

What is claimed is:

1. A white balance processing method, comprising:
   processing an image to determine whether a light source is contained in a scene corresponding to the image by dividing the image into a plurality of regions; and for each of the plurality of regions, determining whether a ratio of a number of pixels each having a pixel value greater than a predetermined value exceeds a predetermined ratio according to a histogram of the respective region;
   in response to determining that the light source is contained in the scene, processing the image according to a first predetermined algorithm to acquire color temperature of the light source in the scene and performing a white balance processing on the image according to the color temperature of the light source; and
   in response to determining that no light source is contained in the scene, performing the white balance processing on the image according to a second predetermined algorithm, the second predetermined algorithm being different from the first predetermined algorithm.

2. The method according to claim 1, further comprising:
   when the ratio of the number of pixels each with the pixel value greater than the predetermined value exceeds the predetermined ratio, determining that the region is a target region having the light source according to the histogram of the region; and
   when the ratio of the number of pixels each with the pixel value greater than the predetermined value does not exceed the predetermined ratio, determining that the region is not the target region having the light source according to the histogram of the region.

3. The method according to claim 1, wherein processing the image to determine whether the light source is contained in the scene corresponding to the image comprises:
   in response to determining that the light source is contained in the scene, determining whether at least two target regions adjacent to each other exist;
   in response to determining that the at least two target regions exist, stitching at least two light sources contained in the at least two target regions into the light source contained in the scene; and
   in response to determining that the at least two target regions do not exist, determining the light source contained in the target region as the light source contained in the scene.

4. The method according to claim 3, wherein processing the image according to the first predetermined algorithm to acquire the color temperature of the light source in the scene and performing the white balance processing on the image according to the color temperature of the image, in response to determining that the light source is contained in the scene comprises:
   determining a first region and a second region according to a brightness distribution along a radial direction from a center of the light source;
   subtracting averaged pixel values of a primary color channels of the second region from averaged pixel values of the primary color channels of the first region to determine a color of the light source contained in the scene; and
   determining the color temperature of the light source according to the color of the light source.

5. The method according to claim 4, wherein the first region is defined by pixels all having brightness values within a first brightness range along the radial direction from the center of the light source, and the second region is defined by pixels all having brightness values within a second brightness range along the radial direction from the center of the light source, and an upper limit of the second brightness range is less than or equal to a lower limit of the first brightness range.

6. The method according to claim 5, wherein the first brightness range and the second brightness range are determined according to a brightness distribution along the radial direction from the center of light source.

7. The method according to claim 4, wherein each of the primary color channels is one of a red channel, a green-red channel, a green-blue channel and a blue channel; and
   an averaged pixel value for the green channel is obtained according to pixel values of the green-red channel and pixel values of the green-blue channel.

8. The method according to claim 4, wherein determining the color temperature of the light source according to the color of the light source comprises:
   determining the color temperature of the light source according to a correspondence between colors of light sources and color temperature of light sources based on the color of the light source;
   wherein the correspondence between the colors of light sources and the color temperature of light sources is obtained in advance and is a mapping table or a color temperature curve.

9. The method according to claim 8, further comprising:
   acquiring images under illumination with standard light boxes having different color temperature;

calculating colors of the light sources corresponding respectively to the different color temperature based on the images; and establishing the mapping table or drawing the color temperature curve according to the colors of the light sources corresponding respectively to the different color temperature.

10. The method according to claim 1, wherein performing the white balance processing on the image according to the color temperature of the light source comprises:

acquiring a white balance parameter by performing a search on a predetermined correspondence between color temperature of light sources and white balance parameters based on the color temperature of the light source; and performing the white balance processing on the image according to the acquired white balance parameter.

11. The method according to claim 1, wherein performing the white balance processing on the image according to the second predetermined algorithm in response to determining that no light source is contained in the scene comprises:

calculating averaged pixel values of primary color channels of the image;

determining adjustment values for the primary color channels of the image according to the averaged pixel values of the primary color channels of the image; and performing the white balance processing on the image according to the adjustment values for the primary color channels.

12. The method according to claim 11, wherein determining the adjustment values for the primary color channels of the image according to the averaged pixel values of the primary color channels of the image comprises:

determining an adjustment reference value for the primary color channels according to the averaged pixel values; and determining the adjustment values by multiplying the adjustment value by the averaged values, for the primary color channels.

13. The method according to claim 1, wherein the first algorithm is used for performing the white balance processing on the image by detecting the color temperature of the light source, and the second algorithm is used for performing the white balance processing on the image without detection of the color temperature of the light source.

14. An electronic device, comprising:
one or more processors;
a memory; and
one or more programs, stored in the memory and configured to be executable by the one or more processors;
wherein the one or more programs comprise instructions, when the instructions are executed, the one or more processors are configured to:

process an image to determine whether a light source is contained in a scene corresponding to the image by dividing the image into a plurality of regions; and for each of the plurality of regions, determining whether a ratio of a number of pixels each having a pixel value greater than a predetermined value exceeds a predetermined ratio according to a histogram of the respective region;

in response to determining that the light source is contained in the scene, process the image according to a first predetermined algorithm to acquire color temperature of the light source in the scene and perform a white balance processing on the image according to the color temperature of the light source; and in response to determining that no light source is contained in the scene, perform the white balance processing on the image according to a second predetermined algorithm, the second predetermined algorithm being different from the first predetermined algorithm.

15. The electronic device according to claim 14, wherein the one or more processors are configured to process the image to determine whether the light source is contained in the scene corresponding to the image by acts of:

in response to determining that the light source is contained in the scene, determining whether at least two target regions adjacent to each other exist;

in response to determining that the at least two target regions exist, stitching at least two light sources contained in the at least two target regions into the light source contained in the scene; and in response to determining that the at least two target regions do not exist, determining the light source contained in the target region as the light source contained in the scene.

16. The electronic device according to claim 15, wherein the one or more processors are configured to process the image according to the first predetermined algorithm to acquire the color temperature of the light source in the scene and perform the white balance processing on the image according to the color temperature of the image, in response to determining that the light source is contained in the scene by acts of:

determining a first region and a second region according to a brightness distribution along a radial direction from a center of the light source;

subtracting averaged pixel values of primary color channels of the second region from averaged pixel values of the primary color channels of the first region to determine a color of the light source contained in the scene; and determining the color temperature of the light source according to the color of the light source.

17. The electronic device according to claim 14, wherein the one or more processors are configured to perform the white balance processing on the image according to the second predetermined algorithm in response to determining that no light source is contained in the scene by acts of:

calculating averaged pixel values of primary color channels of the image;

determining adjustment values for the primary color channels of the image according to the averaged pixel values of the primary color channels of the image; and performing the white balance processing on the image according to the adjustment values for the primary color channels.

18. A non-transitory computer readable storage medium, comprising computer programs cooperating with the electronic device, wherein the computer programs are executed by a processor to execute a white balance processing method, the white balance processing method comprises:

processing an image to determine whether a light source is contained in a scene corresponding to the image by dividing the image into a plurality of regions; and for each of the plurality of regions, determining whether a ratio of a number of pixels each having a pixel value greater than a predetermined value exceeds a predetermined ratio according to a histogram of the respective region;

in response to determining that the light source is contained in the scene, processing the image according to a first predetermined algorithm to acquire color temperature of the light source in the scene and performing a white balance processing on the image according to the color temperature of the light source; and in response to determining that no light source is contained in the scene, performing the white balance processing on the image according to a second predetermined algorithm, the second predetermined algorithm being different from the first predetermined algorithm.

* * * * *